April 7, 1925.
F. E. HARTWEG
ELECTRICAL FITTING
Filed Aug. 22, 1924
1,532,817
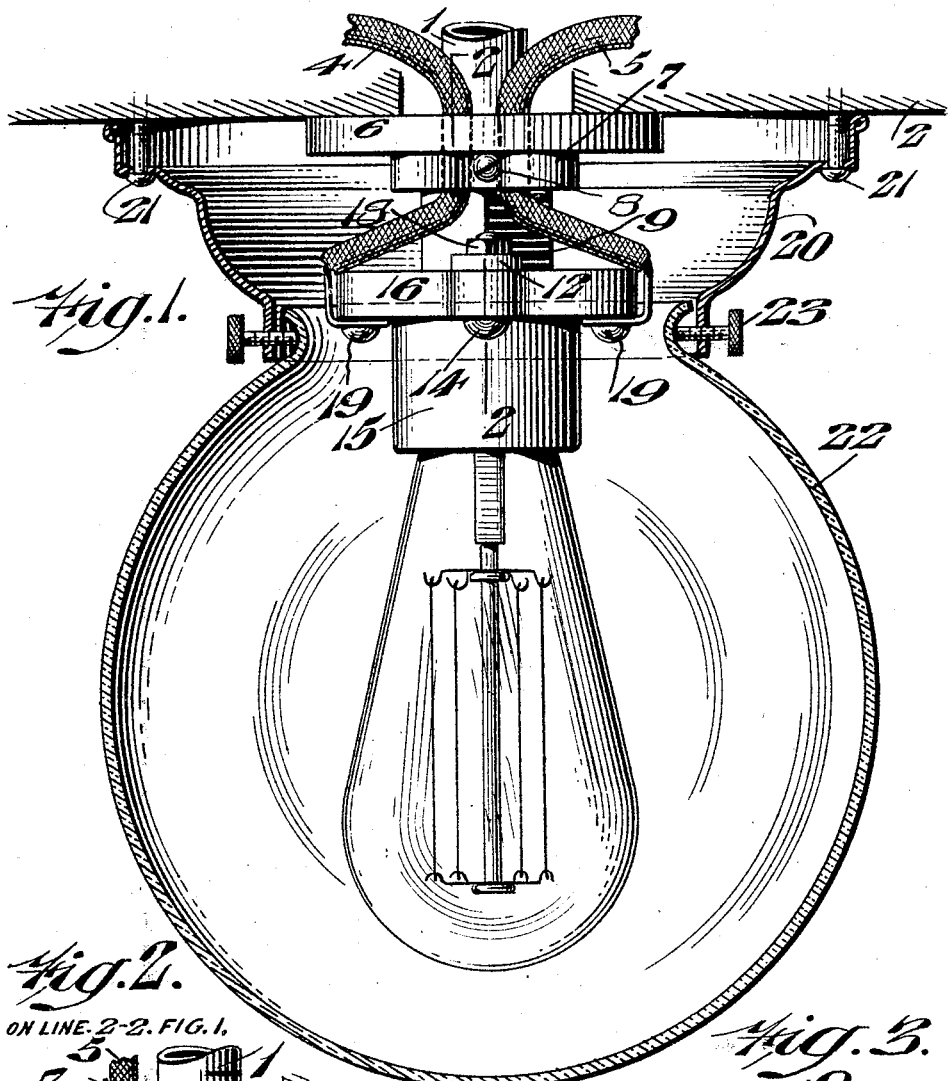
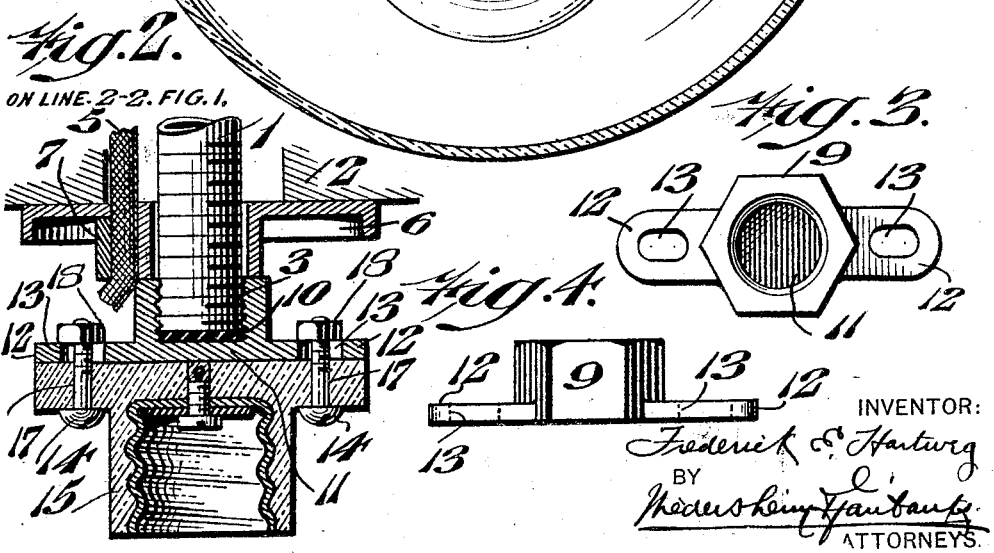
INVENTOR:
Frederick E. Hartweg
BY
ATTORNEYS.

Patented Apr. 7, 1925.

1,532,817

UNITED STATES PATENT OFFICE.

FREDERICK E. HARTWEG, OF PHILADELPHIA, PENNSYLVANIA.

ELECTRICAL FITTING.

Application filed August 22, 1924. Serial No. 733,461.

*To all whom it may concern:*

Be it known that I, FREDERICK E. HARTWEG, a citizen of the United States, residing at Philadelphia, in the county of Philadelphia and State of Pennsylvania, have invented a certain new and useful Electrical Fitting, of which the following is a specification.

My invention relates to a new and novel electrical fitting of the general type known as a coupling, adapted to be secured to the threaded end of a gas pipe extending through the ceiling or wall, to seal the open end of the same in gas-tight manner, and also adapted to receive an electric light socket and to support the same rigidly and securely.

My novel electrical fitting is particularly useful in changing from gas lighting systems to electrical lighting systems where the gas pipes already existing are used as a support for the electrical outlet sockets.

It has been customary heretofore in replacing gas lighting with electrical lighting, to cut off the gas pipe close to the surface of the ceiling or wall, if it extended any distance beyond the surface, then to thread the same and to close the open threaded end by a cap, then providing some other means upon which to support an electrical outlet socket thereby making it necessary to use some additional support or fitting for the socket. By my novel construction in a coupling I provide a novel means for closing the open end of the pipe without necessity of shortening the same, and also provide a support for an electrical outlet socket.

With the above ends in view, my invention consists of a substantially cylindrical cap portion, having integral therewith a flat supporting flange or bracket adapted to receive a porcelain lighting socket and adapted to have the same secured thereto by means of screws or bolts.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Fig. 1, represents a front elevation of a novel construction embodying my invention.

Fig. 2, represents a section on line 2—2 of Fig. 1.

Fig. 3, represents a plan view of my novel coupling bracket, and

Fig. 4, represents a front elevation of the same.

Referring to the drawings, 1 designates a portion of a gas pipe extending through and beyond the wall or ceiling 2 and having the threaded end 3. The wires 4 and 5 extending through the ceiling 2 are first passed through a retaining plate 6 and are secured therein by the clamp 7 and the screw 8. My novel coupling bracket 9 is threaded onto the end 3 of the pipe 1 thereby closing the open end thereof, and at the same time if desired retaining the plate 6 in position. If desired a packing gasket 10 may be inserted into the cavity 11 of the coupling, so as to insure a gas pipe closure of the end of the pipe, although it will suffice to simply use the customary white lead on the threads. The coupling bracket 9 is provided with the flanges or supporting brackets 12 integral with the body of the coupling, and having elongated openings 13 therethrough for the reception of the retaining screws 14.

The porcelain socket 15 having a base 16, is placed against the bottom face of the flanges 12, the machine screws 14 are passed through the openings 17 in the base 16 of the socket and through the elongated openings 13, and the nuts 18 are threaded onto the ends thereof. The socket 15 is thereby rigidly secured to the coupling bracket 9 and the bare ends of the wires 4 and 5 may then be attached electrically to the terminal screws 19 of the socket 15. The usual canopy 20 may then be screwed to the ceiling proper in the usual manner by means of the screws 21, and the shade or bowl 22 may then be fastened in the canopy by means of the retaining screws 23.

It will be noticed that by my novel construction there is provided a rigid support for the electrical outlet socket 15 on the end of a gas pipe without any additional supporting means, other than the cap used to close the open end of the gas pipe. It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In an electrical fitting, a cap portion shaped for tool accommodation and having a threaded bore therein for the reception of the threaded end of a pipe, said cap having formed integral therewith a bottom wall closing one end of said bore, horizontal flanges extending from each side of said cap portion substantially flush with the bottom surface thereof, and integral therewith, an elongated opening through each of said flanges for receiving the socket supporting means, an electrical socket in abutting relation with the underside of said flanges and means passing through said flange openings for removably clamping said socket to said flanges.

2. In a device of the character described, a cap portion, a threaded bore in said cap portion for the reception of the threaded end of a pipe, substantially horizontal flanges extending from the cap portion and integral therewith, elongated openings through said flanges, an electrical socket having its base juxtaposed to said flanges and having openings through said base in alignment with the openings through said flanges, screws passing through said openings in said base and flanges, and a nut threaded on each of said screws securing said socket to said flanges rigidly.

FREDERICK E. HARTWEG.